(12) United States Patent
Gogolev et al.

(10) Patent No.: US 12,375,416 B2
(45) Date of Patent: Jul. 29, 2025

(54) ESTABLISHING TIME-SENSITIVE COMMUNICATIONS BETWEEN INDUSTRIAL END DEVICES AND AN ETHERNET NETWORK

(71) Applicant: ABB Schweiz AG, Baden (CH)

(72) Inventors: Alexander Gogolev, Dachau (DE); Johan Åkerberg, Västerås (SE); Mallikarjun Kande, Solon, OH (US)

(73) Assignee: ABB Schweiz AG, Baden (CH)

( * ) Notice: Subject to any disclaimer, the term of this patent is extended or adjusted under 35 U.S.C. 154(b) by 363 days.

(21) Appl. No.: 17/941,152

(22) Filed: Sep. 9, 2022

(65) Prior Publication Data
US 2023/0006939 A1 Jan. 5, 2023

Related U.S. Application Data

(63) Continuation of application No. PCT/EP2021/055792, filed on Mar. 8, 2021.

(30) Foreign Application Priority Data

Mar. 11, 2020 (EP) .................................. 20162480

(51) Int. Cl.
*H04L 47/28* (2022.01)
*H04L 41/0803* (2022.01)
*H04L 45/24* (2022.01)

(52) U.S. Cl.
CPC .......... *H04L 47/28* (2013.01); *H04L 41/0803* (2013.01); *H04L 45/24* (2013.01)

(58) Field of Classification Search
CPC ..... H04L 47/28; H04L 41/0803; H04L 45/24; H04L 12/46
See application file for complete search history.

(56) References Cited

U.S. PATENT DOCUMENTS 10,044,524 B1    8/2018  Edelhaus et al.
10,862,802 B1*  12/2020  Subramanian ...... H04L 12/4645
(Continued)

FOREIGN PATENT DOCUMENTS

CA      3031250 A1    1/2018
CN      103098396 A   5/2013
(Continued)

OTHER PUBLICATIONS

Nasarallah, et al. :Ultra-Low Latency (ULL) Networks: The IEEE TSN and IETF DetNet Standards and Related 5G ULL Research; 2019.*

(Continued)

*Primary Examiner* — Jay P Patel
(74) *Attorney, Agent, or Firm* — Leydig, Voit & Mayer, Ltd.

(57) ABSTRACT

A method for establishing time-sensitive communication from at least one end device in an industrial plant into an Ethernet network with extended functionality for time-sensitive communication includes obtaining a first information model of the at least one end device, obtaining a second information model of the Ethernet network; determining first configuration information; determining second configuration information; transmitting the first configuration information to the at least one end device; and transmitting the second configuration information to the at least one network device.

11 Claims, 3 Drawing Sheets

(56) References Cited

U.S. PATENT DOCUMENTS

| | | | |
|---|---|---|---|
| 2018/0248980 A1 | 8/2018 | Götz et al. | |
| 2019/0068400 A1 | 2/2019 | Krikorian et al. | |
| 2020/0259896 A1* | 8/2020 | Sachs | H04L 67/12 |
| 2021/0274375 A1* | 9/2021 | Li | H04W 28/10 |
| 2021/0344735 A1* | 11/2021 | Ke | H04L 47/2491 |
| 2021/0409307 A1* | 12/2021 | Åkerberg | H04L 45/1287 |

FOREIGN PATENT DOCUMENTS

| | | |
|---|---|---|
| CN | 103124224 A | 5/2013 |
| EP | 2805441 B1 | 10/2017 |
| IL | 258869 A | 6/2018 |
| WO | WO 2017/092879 A1 | 6/2017 |
| WO | WO 2017/093014 A1 | 6/2017 |
| WO | WO 2020/035127 A1 | 2/2020 |

OTHER PUBLICATIONS

Gogolev et al., "TSN-Enabled OPC UA in Field Devices," *2018 IEEE 23rd International Conference on Emerging Technologies and Factory Automation (ETFA)*, vol. 1, IEEE, 297-303 (Sep. 4-7, 2018).

Gogolev et al., "TSN Traffic Shaping for OPC UA Field Devices," *2019 IEEE 17th International Conference on Industrial Informatics (INDIN)*, vol. 1, IEEE, 951-956 (Jul. 22-25, 2019).

Nasrallah et al., "Ultra-Low Latency (ULL) Networks: The IEEE TSN and IETF DetNet Standards and Related 5G ULL Research," *IEEE Communications Surveys & Tutorials*, 21(1), 59 pp. (Sep. 11, 2018).

Schriegel et al., "Investigation on a Distributed SDN Control Plane Architecture for Heterogeneous Time Sensitive Networks," *2018 14th IEEE International Workshop on Factory Communication Systems (WFCS)*, IEEE, 10 pp. (Jun. 13-15, 2018).

European Patent Office, International Search Report in International Patent Application No. PCT/EP2021/055792, 4 pp. (Apr. 26, 2021).

European Patent Office, Written Opinion in International Patent Application No. PCT/EP2021/055792, 7 pp. (Apr. 26, 2021).

The Patent Office of The People's Republic of China, Office Action in Chinese Patent Application No. 202180020643.0, 8 pp. (May 31, 2023).

* cited by examiner

ESTABLISHING TIME-SENSITIVE COMMUNICATIONS BETWEEN INDUSTRIAL END DEVICES AND AN ETHERNET NETWORK

CROSS-REFERENCE TO RELATED APPLICATIONS

This patent application claims priority to International Patent Application No. PCT/EP2021/055792, filed on Mar. 8, 2021, which claims priority to European Patent Application No. 20162480.6, filed on Mar. 11, 2020, each of which is incorporated in its entirety herein.

FIELD OF THE DISCLOSURE

The present disclosure is directed to communication systems and methods for time sensitive messages from, to and between end devices in an industrial plant over an Ethernet network.

BACKGROUND OF THE INVENTION

Industrial plants are increasingly fitted with Ethernet networks that are enhanced with extended functionality for time-sensitive communication. Many "Industry 4.0" concepts assume that communication over Ethernet with Time-Sensitive Network, TSN, functionality, in combination with Open Platform Communications Unified Architecture, OPC UA, will fully replace various control applications and fieldbuses. EP 2 805 441 B1 discloses a method for configuring transmission of data over a packet switched data network between time-synchronized communication modules.

Conveying an urgent message from an end device to a destination on the Ethernet network is teamwork. The end device needs to convey to network devices of the Ethernet network that the message is time-sensitive, and the network devices need to perform the forwarding in the given Ethernet network.

BRIEF SUMMARY OF THE INVENTION

In one general aspect, the present disclosure describes systems and methods for facilitating the establishing of time-sensitive communications from given industrial end devices to destinations in a given Ethernet network in an industrial plant.

This objective is achieved by method for establishing time-sensitive communication from at least one end device in an industrial plant into an Ethernet network with extended functionality for time-sensitive communication.

In an exemplary embodiment in accordance with the disclosure, a method for establishing time-sensitive communication from at least one end device in an industrial plant into an Ethernet network with extended functionality for time-sensitive communication is described. In particular, this functionality for time-sensitive communication may be Time-Sensitive Networking, TSN, functionality. TSN functionality is in the process of being standardized by the IEEE Time-Sensitive Networking Task Group. However, any other functionality for time-sensitive communication may be used as well in the context of the invention.

In the course of the method, a first information model of the at least one device, and/or of at least a portion of the plant that comprises the at least one end device, is obtained. The information model may also relate to the plant as a whole. The information model is indicative of the type and/or content of messages that are to be sent to the Ethernet network by the at least one end device, and it is also indicative of the destinations of said messages. On top of that, the information model may comprise any other information that characterizes the end device and facilitates For example, the first information model may indicate one or more of the following a type of the end device (e.g., sensor, actuator, controller);
inputs to the end device, which may be in the form of signals (e.g., requests for measurement values or commands to perform actions), but also in the form of educts or other media that are fed to the end device for handling and/or processing;
outputs from the end device, which may be in the form of signals (e.g., measurement values or confirmations that actions have been performed), but also in the form of products or other media that leave the end device as a work result of any handling and/or processing;
requirements and constraints for interfacing the end device with other end devices; and
quantitative performance data of the end device (e.g., a measurement range of a sensor, or a throughput of a processing device).

BRIEF DESCRIPTION OF THE SEVERAL VIEWS OF THE DRAWING(S)

DETAILED DESCRIPTION OF THE INVENTION

Figure 1:
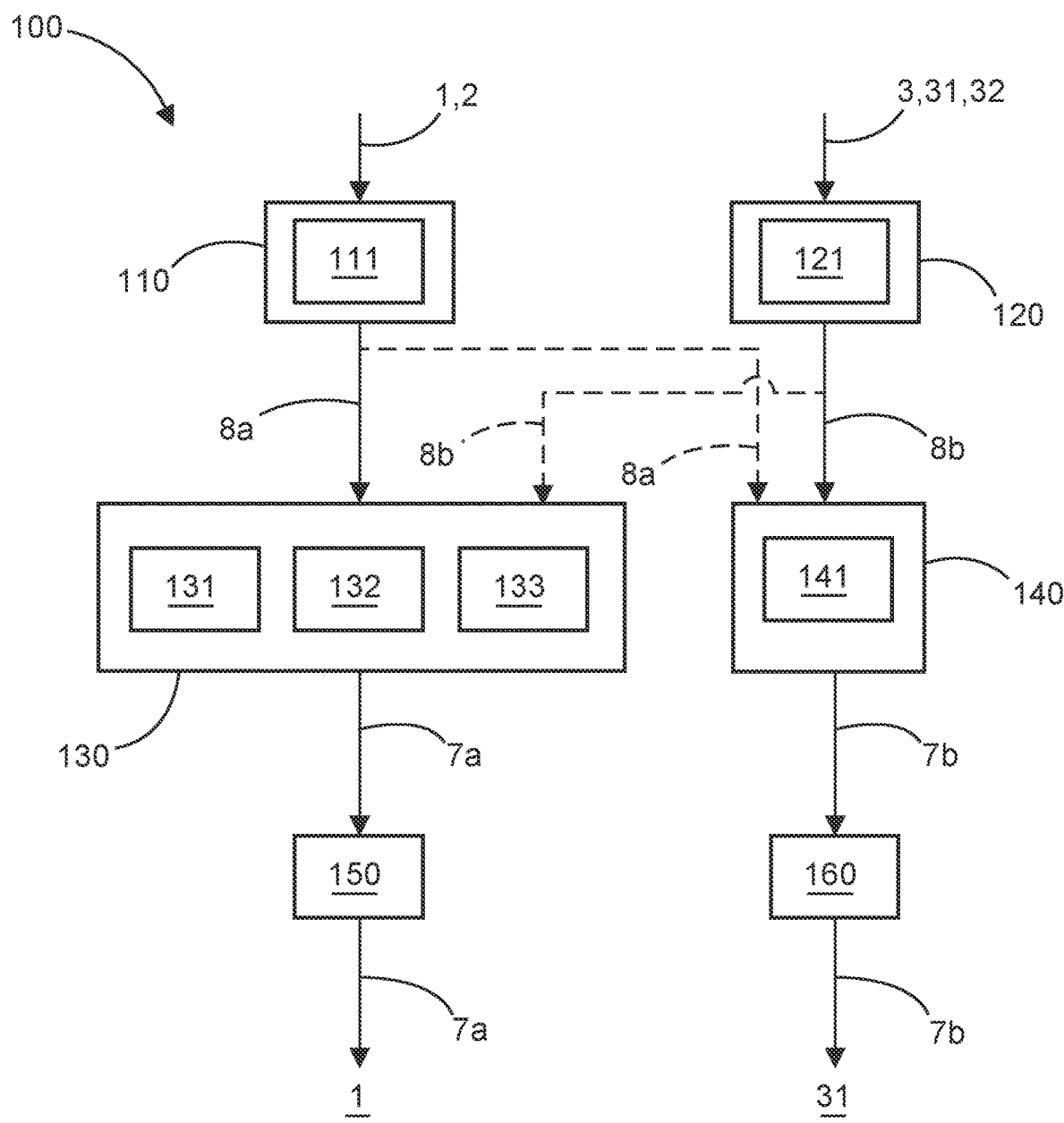
FIG. 1 is a diagram of an exemplary embodiment of a method in accordance with the disclosure.

FIG. 1 is a schematic flow chart of an exemplary embodiment of the method 100.

In step 110, a first information model 8a of an end device 1, and/or of an industrial plant 2, is obtained. According to block 111, an inventory of end devices 1 may be automatically obtained.

In step 120, a second information model 8b of the Ethernet network 3 is obtained. According to block 121, an inventory of network devices 31 and interconnections 32 between these network devices 31 may be automatically obtained.

In step 130, based at least in part on the first information model 8a, first configuration information 7a for at least one end device 1 is determined. Likewise, in step 140, based at least in part on the second information model 8b, second configuration information 7b for at least one network device 31 is obtained. As it was discussed before and is shown in FIG. 1 by the dashed lines, in steps 130 and 140, information from the respective other information model 8b, 8a may be used additionally.

According to block 131, the first configuration 7a may specifically comprise rules 6 for prioritizing messages 4. This is detailed further in FIG. 2.

According to block 132, the first configuration information 7a may specifically comprise instructions for the end device 1 how to encode requests **3\*\* for particular functionality 3\*** for time-sensitive communication.

According to block 133, the first configuration information 7a may specifically comprise information that enables the end device 1 to synchronize an internal system time with the Ethernet network 3, and/or a schedule for transmitting messages 4 from the end device 1 to the Ethernet network 3.

According to block 141, the to-be-configured network device 31 may be chosen out of several possible network devices 31 based on quantitative utilization.

In step 150, the first configuration information 7a is sent to the end device 1. In step 160, the second configuration information 7b is sent to the network device 31.

Figure 2:
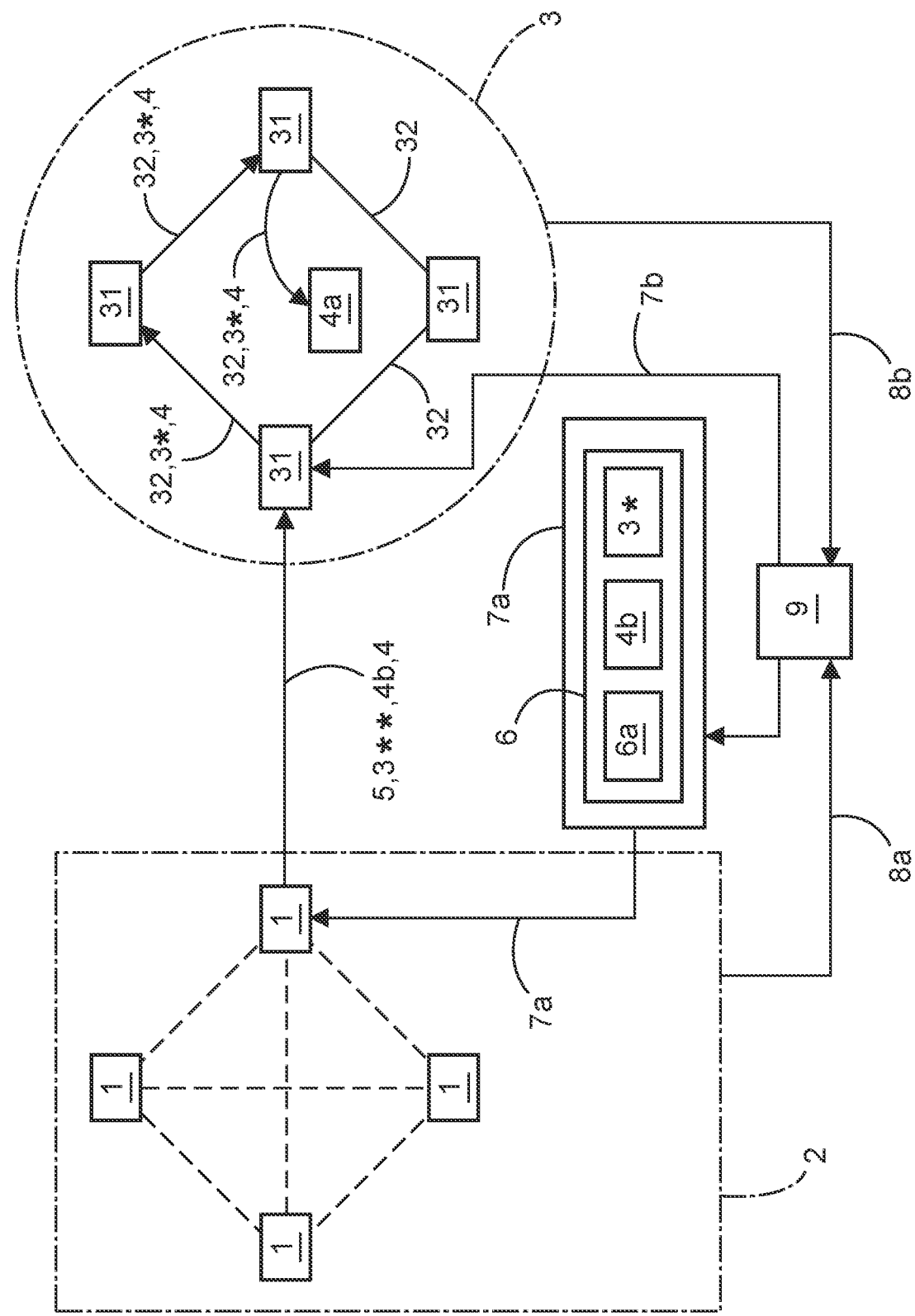
FIG. 2 is a diagram of an exemplary landscape of an industrial plant with end devices and an Ethernet network, which is centrally orchestrated by an orchestrating entity in accordance with the disclosure.

FIG. 2 shows a landscape that comprises an industrial plant 2 with several end devices 1, as well as an Ethernet network 3 with functionality 3\* for time-sensitive communication. For simplicity, the industrial plant 2 and the network 3 have been drawn as separate entities in FIG. 2. In reality, the Ethernet network 3 may reside within the plant 2, and in the plant 2, it may even be intermixed with the connections between the end devices 1 that are drawn as dashed lines. For example, the destination 4a for a message 4 that is drawn inside the Ethernet network 3 may be a controller or an actuator in the plant 2 (that is, another end device 1) that has to react to the message 4.

The orchestrating entity 9 obtains the first information model 8a of the plant 2, as well as the second information model 8b of the Ethernet network 3 that details the network devices 31, the interconnections 32 between these network devices 31, as well as the placement of other components or devices (such as the destination 4a for messages 4). The orchestrating entity 9 creates first configuration information 7a for the end device 1 and second configuration information 7b for the network device 31.

In the example shown in FIG. 2, the first configuration information 7a comprises rules 6 for the handling of messages 4 that the end device 1 intends to send. If the message 4 matches a condition 6a of the rule 6, the message 4 may be assigned a priority 4b, and/or the use of a functionality 3\* for time-sensitive communication may be requested by end device 1.

The end device 1 may wrap the message 4, its priority 3b, and any requests **3\*\* to use functionality 3\* in at least one Ethernet frame 5 and send these frames into the Ethernet network 3. The network device 31 may decode the request 3\*\* to use functionality 3\* and forward the message 4 within the Ethernet network 3 to its destination 4a**.

Figure 3:
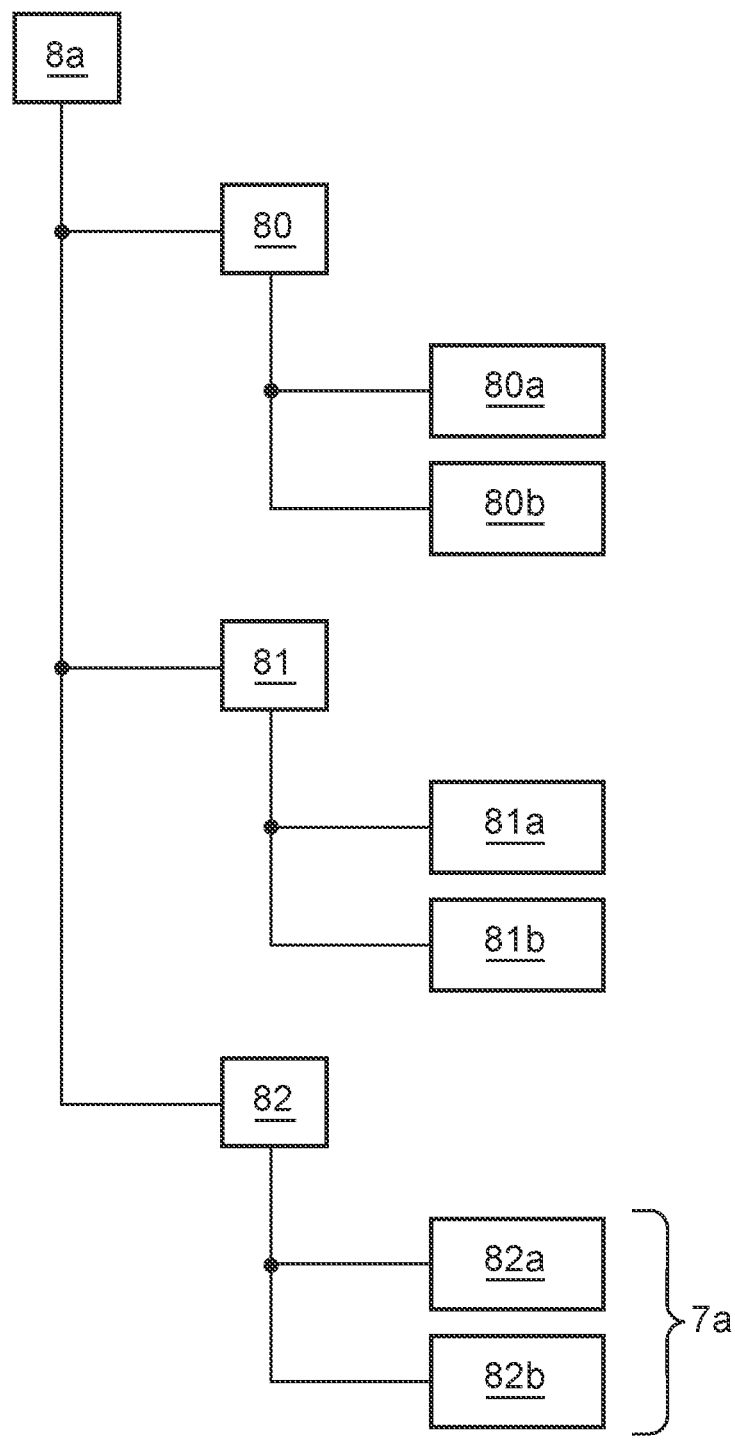
FIG. 3 is a diagram of an exemplary embodiment of a first information model data structure that is extended by configuration information for time-sensitive communication in accordance with the disclosure.

FIG. 3 shows an exemplary embodiment of a first information model 8a data structure. It is an OPC data structure that is organized in a tree. In the example of FIG. 3, the information nodes are organized into three address spaces 80, 81 and 82. The first address space 80 contains information nodes 80a, 80b that relate to general information about the central orchestration by orchestrating entity 9. The second address space 81 contains information nodes 81a, 81b that relate to features and parameters of an end device 1. The third address space 82 contains information nodes 82a, 82b that relate to the functionality 3\* for time-sensitive communication in the Ethernet network 3. By providing this information as first configuration information 7a to the end device 1, an end device 1 that was previously not aware of the presence of this functionality in the Ethernet network 3 may be fully enabled to use it.

LIST OF REFERENCE SIGNS

1 end device 1
2 industrial plant
3 Ethernet network in industrial plant 2
3\* functionality for time-sensitive communication in network 3
**3\*\* request to use functionality 3\***
31 network device of Ethernet network 3
32 interconnection in Ethernet network 3
4 message
4a destination of message
4b priority of message
5 Ethernet frames
6 rule in first configuration information 7a
6a condition in rule 6
7a first configuration information for end device 1
7b second configuration information for network device 31
8a first information model for end device 1 and/or plant 2
80-82 address spaces in first information model 8
80a-80b information nodes in address space 80
81a-81b information nodes in address space 81
82a-82b information nodes in address space 82
8b second information model for Ethernet network 3
9 central orchestrating entity
100 method for establishing time-sensitive communication
110 obtaining first information model 8a
111 obtaining inventory of end devices 1
120 obtaining second information model 8b
121 obtaining inventory of network devices 31, interconnections 32
130 determining first configuration information 7a
131 including rules 6 in configuration information 7a
132 including information how to encode request **3\*\* in information 7a**
133 including time synchronization information in information 7a
140 determining second configuration information 7b
141 choosing one of several possible network devices 31
150 transmitting first configuration information 7a to end device 1
160 transmitting second configuration information 7b to network device 31

The method in accordance with the disclosure may include additional features.

In particular, the granularity of the end devices that make up the industrial plant is arbitrary. Some end devices that have a need to communicate may be individual actors, sensors or controllers, while some end devices may be larger units that internally comprise a plurality of actors, sensors or controllers. For example, modular industrial plants are composed of processing modules that may be connected ad-hoc in order to form a plant for a specific job, and separated from one another again after this job is finished. Each such module may then be considered as an end device. In particular, the first information model may at least partially overlap with a Module Type Package, MTP, or any other description of the module.

A second information model of the Ethernet network is obtained. This second information model is indicative of network devices and physical links within the Ethernet network. It is also indicative of the extended functionality for time-sensitive communication available in the Ethernet network, at an arbitrary level of granularity. For example, this second information model may indicate, for each network device, the functionality and features for time-sensitive communication that this network device provides. On top of this, the second information model may indicate one or more of the following:
- a type of at least one network device (e.g., a switch, a router or a bridge);
- capabilities of at least one network device, in particular functionality of the network device to contribute to time-sensitive communication on the Ethernet network;
- a topology of interconnections between network devices and destinations for messages attached to the Ethernet network;
- requirements and constraints for interfacing at least one network device with the network; and
- quantitative capacities of network devices or interconnections.

Based at least in part on the first information model, first configuration information for the at least one end device is determined. This first configuration information enables the at least one end device to transmit, into the Ethernet network, a message and an indication of the functionality for time-sensitive communication to be used when transporting this message. This first configuration information is transmitted to the at least one end device.

The first configuration information may also be based in part on the second information model. For example, the second information model may indicate which concrete functionality for time-sensitive communication is present in the Ethernet network in the first place, and the end device may be instructed, by means of the first configuration information, to request a certain subset of this functionality. Also, the second information model may indicate where the destination for the message that is to be sent from the at least one end device resides in the Ethernet network.

Based at least in part on the second information model, second configuration information for at least one network device in the Ethernet network is determined. This second configuration information enables at least one network device in the Ethernet network to forward the message to its destination on the Ethernet network, using said functionality for time-sensitive communication that has been indicated by the at least one end device. This second configuration information is transmitted to the at least one network device.

The second configuration information may also be based in part on the first information model. For example, the first information model may indicate the type and size of messages that are to be sent by at least one end device. Also, the first information model may indicate the destinations to which messages are to be sent, so that in combination with the locations of such destinations obtained from the second information model, a path for the desired communication may be worked out.

Thus, by combining the information from both the first information model and the second information model, an orchestrating entity may broker the establishing of the time-sensitive communication from the end device into the Ethernet network. For this to work, the end device does not need to know any details of the Ethernet network, and the network devices do not need to know any details of the end devices.

This is particularly advantageous in an environment where frequent changes to the configuration of the industrial plant, and/or to the Ethernet network, are to be expected. For example, in a modular industrial plant, the configuration of modules changes whenever a particular production job has been finished and the plant needs to be adapted to fit the next intended job. Whenever something changes in one place, the interdependencies among end devices, as well as the interdependencies between the end devices on the one hand and the Ethernet network on the other hand, may require further changes in order to preserve the functioning of time-sensitive communication in all needed relations from particular end devices to particular destinations. This is very hard, if not impossible, to keep track of manually.

Also, there may be peculiarities in the Ethernet network that an administrator of end devices is not aware of, and vice versa. For example, a first section of the Ethernet network in a plant may already have modern network devices with all features that the latest version of the TSN standard has to offer, while a second section of the Ethernet network is still using the previous generation of network devices that has less features. Which functionality for time-sensitive communication may be used can therefore depend, e.g., on where the destination of the message resides in the Ethernet network.

In particular, the first information model, and/or the second information model, may be an Open Platform Communications Uniform Architecture, OPC UA, information model. This layer of abstraction specifically facilitates said brokering of the time-sensitive communication by using information from both the first and the second information model. In particular, same things and properties are likely to have same representations in the models even if the set of end devices, and/or the set of network devices, comprises a mixture of devices from different vendors, or from different device generations. For example, some end devices may be in use in the industrial plant for a long time up to several decades, and they may be working side by side with recent end devices.

In particular in the context of UA, the information models on the one hand, and the configuration information on the other hand, need not be wholly different data structures. Rather, for example, the configuration information may be appended to the previously received information model as another part of this information model (e.g., a new "address space"), and then this augmented information model may be fed back to the end device, respectively to the network device.

The first information model may come from any source. For example, the industrial plant may have been created in the first place according to an engineered plan or model that also comprises the first information model. A first information model may also come bundled with a first end device, and multiple such first information models may be amalgamated into one.

In a particularly advantageous embodiment, the obtaining of the first information model specifically comprises establishing, based at least in part on messages sent by end devices, and/or on responses of end devices to at least one query, an inventory of end devices within the industrial plant. For example, an orchestration entity may send a broadcast query in order to solicit responses from all end devices on a network segment. Alternatively or in combination, the orchestration entity may also query end devices one by one to gather information. An automated generation of a first information model in this manner saves a lot of time and engineering effort particularly in a situation where frequent changes to the industrial plant are to be expected, such as in modular industrial plants.

Likewise, in a particularly advantageous embodiment, the obtaining of the second information model specifically comprises establishing, based at least in part on responses by network devices to at least one query, an inventory of network devices and physical links in the Ethernet network. In particular, Ethernet network installations have a tendency to grow over time, and expansions are often added in various places without a network-wide coordination. Also, because it is easy to add new network devices and changes to existing network devices are not always required for the new devices to join the network, a centralized documentation of the network topology frequently lags behind the actual topology.

In a further particularly advantageous embodiment, the first configuration information comprises at least one rule for the end device to assign a particular priority or quality of service, QoS, class to a message, and/or to request the use of a particular functionality for time-sensitive communication, in response to the message meeting at least one predetermined condition. The whole point of having time-sensitive communication of end devices into the Ethernet network is to guarantee timely delivery of important messages. But a message is not important per se, just like the letter A is not more important than the letter B per se. A message becomes more important or less important in the concrete context of the plant. It is therefore advantageous to centrally orchestrate the criteria that are used to assign priorities to messages.

Every time the end device creates a message, this message may be checked against the rules obtained from the first configuration information, and then the appropriate priority may then be assigned to this particular message.

For example, at least one condition in at least one rule may specifically comprise that the end device indicates, by virtue of the message, an abnormality it has detected. Specifically, the end device may indicate in this manner that it is in an abnormal state. For example, if a heating element does not complete an electric circuit with a power source despite being connected to the power source, this may indicate that the heating element is broken and there is no conductive path through it.

The end device may also indicate that a physical action performed by the end device on an industrial process executed by the industrial plant has failed. For example, after a valve has been instructed to open or close and has actuated its drive mechanism to move the valve member accordingly, it may be checked with a proximity sensor whether the valve member has actually reached the intended position or whether it is stuck.

Alternatively or in combination, at least one condition in at least one rule may comprise that a measurement value of a physical quantity comprised in the message falls above or below a predetermined threshold value set in the at least one rule.

The rationale behind this is that many sensors are present in an industrial plant for the purpose of detecting abnormal conditions. As long as there is no abnormality, there is no urgent need to follow, say, a temperature value that is bobbing up and down between 30° C. and 32° C. In a typical industrial plant, there will be a large flood of such non-urgent, normal measurement values. But when a sudden departure of a measurement value from the normal state indicated a problem, immediate action may be required. For example, if said temperature suddenly breaks out of the 30° C. to 32° C. band and shoots up to 40° C., this may indicate that a cooling fan has stopped working, and a device has to be shut off immediately in order to avoid overheating.

In another example, the concrete current value that a valve motor draws while actuating the valve is not interesting most of the time. But if the current is lower than a certain threshold, then this may indicate that the mechanical connection between the motor and the valve member is broken, so that the motor does not act upon the valve member any more. If the current is higher than a certain threshold, this may indicate that the movement of the valve member is impeded by an unusually high resistance, so that the valve member may be close to getting stuck altogether.

In a further particularly advantageous embodiment, the first configuration information includes instructions for the end device how to encode a request for a particular functionality for time-sensitive communication in at least one Ethernet frame transmitted to the Ethernet network. This is an aspect than can be brokered very well by an orchestration entity that has access to both the first and the second information model: What a network device that gets to see the message from the end device can understand and map to the use of particular functionality for time-sensitive communication depends on this particular network device. In order to trigger the use of such functionality, the end device needs to speak the same language as the network device.

In a further particularly advantageous embodiment, the first configuration information specifically comprises information that enables the end device to synchronize an internal system time with the Ethernet network, and/or a schedule for transmitting messages from the end device to the Ethernet network. In this manner, even an end device that previously was not aware of the extended functionality for time-sensitive communication, such as TSN functionality, may be made to fully support this functionality.

In a further particularly advantageous embodiment, the second configuration information specifically comprises instructions for a plurality of network devices to configure redundant forwarding paths for the message. For example, based on the first information model, an orchestrating entity may determine that timely delivery of certain alarm messages is critical because damage to the plant might result if transmission fails. Even if the Ethernet network is designed to nominally guarantee delivery of the message within a certain timeframe, this guarantee will not prevent hardware of a network device from failing at the wrong moment. A redundant path ensures that even if one such sudden failure should occur, this failure will not escalate into plant damage by virtue of the belated or failed transmission of the message.

In a further particularly advantageous embodiment, a network device to be configured for the forwarding of a message to a destination is chosen based at least in part on quantitative utilizations of the several network devices. In this manner, the utilization may be spread more evenly across the different network devices, and bottlenecks may be avoided.

There are three main types of industrial end devices for which it is particularly advantageous to make them aware of the extended functionality for time-sensitive communication.

As discussed above, an end device may specifically comprise a sensor that is configured to measure at least one physical property. This physical property is relevant for an industrial process executed by the industrial plant, be it because it is a state variable of the process itself, or because it indicated the working state of equipment that is executing the industrial process.

As discussed above, the end device may comprise an actuator that is configured to perform a physical action on the industrial process.

The end device may also comprise a controller that is configured to drive one or more actuators and receive measurement values from at least one sensor, so as to cause at least one quantity indicated by the measurement values to move to, and/or to remain at, a predetermined setpoint value. For example, a controller may actuate inflow and outflow valves of a reaction vessel, so as to keep a pressure or temperature within the vessel at the setpoint value. Even in a normal operating situation, messages sent by the controller to one or more actuators may be urgent. For example, the maximum slew rate with which the controller may change the temperature or pressure in the vessel may depend on how fast the controller can open or close particular valves.

Delivery of the first configuration information to the end device, and delivery of the second configuration information to the network device, may be organized in any suitable manner.

For example, an end device, or a network device, may send a configuration pull request to an orchestrating entity, and receive the first, or second, configuration information in a pull reply. This is particularly useful when the need to obtain a new configuration arises on the side of the respective device, such as when the device is first commissioned.

Alternatively or in combination, the orchestrating entity may send the first, or second, configuration information to the end device, or to the network device, in a push request, and the respective device may confirm receipt of the configuration information by means of a configuration push reply. This is particularly useful when the need to update the configuration arises on the side of the orchestrating entity, e.g., when deemed necessary by an operator.

The method may be wholly or partially computer-implemented. In this respect, hardware platforms of end devices, as well as network devices, are to be regarded as "computers" in a broad sense as well because these devices are able to execute at least the computer program code in their firmware. The invention therefore also provides one or more computer programs with instructions that, when executed by one or more computers, cause the one or more computers to perform the method described above.

This computer program may be sold on a non-transitory computer storage medium or as a download product that may be transmitted over a network after purchase. The invention therefore also relates to a non-transitory computer storage medium or a download product with the computer program. The invention also relates to one or more computers with the one or more computer programs, and/or with the non-transitory storage medium or download product.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for establishing time-sensitive communication from at least one end device in an industrial plant into an Ethernet network with extended functionality for time-sensitive communication, comprising the steps of:
    obtaining a first information model of the at least one end device, and/or of at least a portion of the plant that comprises the at least one end device, wherein this information model is indicative of the type and/or content of messages that are to be sent to the Ethernet network by the at least one end device, and is also indicative of the destinations of said messages, and wherein the first information model, and/or a second information model, specifically is an Open Platform Communications Uniform Architecture, OPC UA, information model;
    obtaining the second information model of the Ethernet network that is indicative of network devices, physical links within the Ethernet network, and the extended functionality for time-sensitive communication available in the Ethernet network;
    determining, based at least in part on the first information model, first configuration information for the at least one end device, wherein said first configuration information enables the at least one end device to transmit, into the Ethernet network, a message and an indication of the functionality for time-sensitive communication to be used when transporting this message;
    determining, based at least in part on the second information model, second configuration information for at least one network device in the Ethernet network, wherein said second configuration information enables the at least one network device in the Ethernet network to forward the message to its destination on the Ethernet network, using said indicated functionality for time-sensitive communication;
    transmitting the first configuration information to the at least one end device; and
    transmitting the second configuration information to the at least one network device.

2. The method of claim 1, wherein the functionality for time-sensitive communication specifically is Time-Sensitive Networking, TSN, functionality.

3. The method of claim 1, wherein the obtaining of the first information model specifically comprises: establishing, based at least in part on messages sent by end devices, and/or on responses of end devices to at least one query, an inventory of end devices within the industrial plant.

4. The method of claim 1, wherein the obtaining of the second information model specifically comprises: establishing, based at least in part on responses by network devices to at least one query, an inventory of network devices and physical links in the Ethernet network.

5. The method of claim 1, wherein the first configuration information comprises at least one rule for the end device to assign a particular priority or quality of service, QoS, class to a message, and/or to request the use of a particular functionality for time-sensitive communication, in response to the message meeting at least one predetermined condition.

6. The method of claim 5, wherein at least one condition in at least one rule comprises:
the end device indicates, by virtue of the message, that it is in an abnormal state or that a physical action performed by the end device on an industrial process executed by the industrial plant has failed; and/or
a measurement value of a physical quantity that is comprised in the message falls above or below a predetermined threshold value set in the at least one rule.

7. The method of claim 1, wherein the first configuration information includes instructions for the end device how to encode a request for a particular functionality for time-sensitive communication in at least one Ethernet frame transmitted to the Ethernet network.

8. The method of claim 1, wherein the first configuration information comprises information that enables the end device to synchronize an internal system time with the Ethernet network, and/or a schedule for transmitting messages from the end device to the Ethernet network.

9. The method of claim 1, wherein the second configuration information comprises instructions for a plurality of network devices to configure redundant forwarding paths for the message.

10. The method of claim 1, further comprising: choosing at least one out of several network devices available in the Ethernet network based at least in part on quantitative utilizations of the several network devices.

11. The method of claim 1, wherein at least one end device comprises:
a sensor that is configured to measure at least one physical property that is relevant for an industrial process executed by the industrial plant;
an actuator that is configured to perform a physical action on said industrial process; and/or
a controller that is configured to drive one or more actuators and receive measurement values from at least one sensor, so as to cause at least one quantity indicated by the measurement values to move to, and/or to remain at, a predetermined setpoint value.

* * * * *